(12) United States Patent
Terashima et al.

(10) Patent No.: US 6,649,307 B2
(45) Date of Patent: Nov. 18, 2003

(54) NON-AQUEOUS ELECTROLYTE SECONDARY CELL

(75) Inventors: Hideki Terashima, Miyagi (JP); Yuzuru Fukushima, Miyagi (JP); Kimio Takahashi, Miyagi (JP); Hiroko Ohnuma, Miyagi (JP); Kotaro Satori, Kanagawa (JP); Akinori Kita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/902,146

(22) Filed: Jul. 10, 2001

(65) Prior Publication Data

US 2002/0127472 A1 Sep. 12, 2002

(30) Foreign Application Priority Data

Jul. 11, 2000 (JP) ...................... P2000-210326

(51) Int. Cl.$^7$ ................................. H01M 6/18
(52) U.S. Cl. .................. 429/323; 429/322; 429/319; 429/231.1; 429/224; 429/231.95; 429/231.8
(58) Field of Search ............. 429/231.1, 224, 429/322, 323, 319, 231.95, 231.8

(56) References Cited

U.S. PATENT DOCUMENTS

| | | |
|---|---|---|
| 5,192,629 A | 3/1993 | Guyomard et al. |
| 5,631,104 A | 5/1997 | Zhong et al. |
| 6,235,427 B1 * | 5/2001 | Idota et al. ............... 429/218.1 |
| 6,458,487 B1 * | 10/2002 | Takeuchi et al. ............ 429/224 |

FOREIGN PATENT DOCUMENTS

| | | |
|---|---|---|
| EP | 0886334 | 12/1998 |
| JP | 64000658 | 1/1989 |
| JP | 01109662 | 4/1989 |
| JP | 11273730 | 10/1999 |
| JP | 2000021441 | 1/2000 |
| WO | 9815025 | 4/1998 |

* cited by examiner

*Primary Examiner*—Laura Weiner
(74) *Attorney, Agent, or Firm*—Sonnenschein, Nath & Rosenthal LLP

(57) ABSTRACT

The present invention provides a non-aqueous electrolyte secondary cell including: a cathode containing a manganese oxide or a lithium-manganese composite oxide; an anode containing a lithium metal, a lithium alloy, or a material capable of doping/dedoping lithium; and an electrolyte containing at least two electrolyte salts, one of which is $LiBF_4$ contained in the range from 0.005 mol/l to 0.3 mol/l. This enables to increase the cycle characteristic, preventing deterioration of the cell characteristic caused by a repeated use.

6 Claims, 2 Drawing Sheets

NON-AQUEOUS ELECTROLYTE SECONDARY CELL

RELATED APPLICATION DATA

The present invention claims priority to Japanese Application No. P2000-210326 filed Jul. 11, 2000, which application is incorporated herein by reference to the extent permitted by law.

BACKGROUND OF THE INVENTION

1. Field of the Invention

The present invention relates to a non-aqueous electrolyte secondary cell for use as a power source of small and light-weight electric apparatuses and electric automobiles.

2. Description of the Related Art

Recently, various portable electronic apparatuses such as a video camera with video tape recorder, cellular phones, and lap-top computers have been developed and these electronic apparatuses are expected to be reduced in size and weight. Simultaneously with this, various studies are made to improve an energy density of secondary cells used as a drive power source of these electronic apparatuses.

Particularly, a great expectation is paid on non-aqueous electrolyte secondary cells using a lithium metal, a lithium alloy or a material capable of doping/dedoping lithium as an anode material and a composite oxide as a cathode material, i.e. so-called lithium-based secondary cells which have a higher energy density and a smaller weight as compared to conventional lead-acid cells or nickel-cadmium secondary cells.

For example, as a cathode active material, a non-aqueous electrolyte secondary cell using $Li_xCo_yO_2$ having a high discharge potential and a high energy density, i.e., lithium-ion secondary cells are now used in practice.

Moreover, for electric automobiles or load leveling, large-size non-aqueous electrolyte secondary cells are now developed in various fields. As the cell size is increased, more cathode active material is required. Thus, a great amount of raw materials of the cathode active material is required.

However, cobalt as a raw material of $Li_xCo_yO_2$ is rare in resources and cobalt deposits commercially usable are present in few countries, which makes cobalt expensive and its price fluctuates much. There is no guarantee to assure to obtain cobalt in future.

Accordingly, in order to provide such non-aqueous electrolyte secondary cells, it is desirable to obtain a cathode active material using raw materials rich in resources and having the performance equivalent to or more than $Li_xCo_yO_2$.

As such a cathode active material, there has been suggested to use $Li_xNiO_2$ or $Li_xMn_2O_4$ (the value of x depends on discharge/charge and is normally x and y are approximately 1 during synthesis) having a high discharge potential and a high energy density equivalent to $Li_xCo_yO_2$. These raw materials, i.e., nickel and manganese are cheap as compared to cobalt. Especially manganese is cheaper than nickel and rich as a resource. Moreover, manganese dioxide is widely used as a material of manganese dry cells, alkaline-manganese dry cells, and lithium primary cells. This assures to supply manganese dioxide without fail. Thus, a study of a cathode active material using manganese is widely made.

There have been suggested various composite oxides using lithium and manganese (hereinafter, referred to as a lithium-manganese composite oxide) synthesized from various manganese raw materials and lithium raw materials such as $Li_xMn_yO_4(x{\approx}1, y{\approx}2)$ having the spinel crystal structure.

The lithium-manganese composite oxide expressed as $Li_xMn_yO_4(x{\approx}1, y{\approx}2)$ is electrochemically oxidized so as to show potential of 3V or more for lithium and has a theoretical charge/discharge capacity of 148 mAh/g.

Moreover, as the electrolyte of such non-aqueous electrolyte secondary cells when using a non-aqueous electrolyte solution prepared by an electrolyte salt solved in a non-aqueous solvent, what is used most widely is the one using $LiPF_6$ as an electrolyte salt solved in a carbonate-based non-aqueous solvent such as propylene carbonate and diethyl carbonate which has a high electrical conductivity and a stable potential.

However, when using manganese oxide or lithium-manganese composite oxide used as the cathode active material, there arises a problem of deterioration of the cell characteristic due to the charge/discharge cycle.

SUMMARY OF THE INVENTION

It is therefore an object of the present invention to provide a non-aqueous electrolyte secondary cell using as a cathode active material a manganese oxide that can be prepared at a low cost or a lithium-manganese composite oxide which prevent deterioration of the cell characteristic even after repeatedly used.

In order to achieve the aforementioned object, the present invention provides a non-aqueous electrolyte secondary cell having: a cathode containing a manganese oxide or a lithium-manganese composite oxide; an anode containing a lithium metal, a lithium alloy, or a material capable of doping/dedoping lithium; and an electrolyte containing at least two electrolyte salts, which electrolyte contains $LiBF_4$ as one of the electrolyte salt in a range from 0.005 mol/l to 0.3 mol/l.

Because the non-aqueous electrolyte secondary cell having the aforementioned configuration according to the present invention contains $LiBF_4$ as one of the electrolyte salts, a stable film is formed on the anode surface.

DESCRIPTION OF THE PREFERRED EMBODIMENTS

Figure 1:
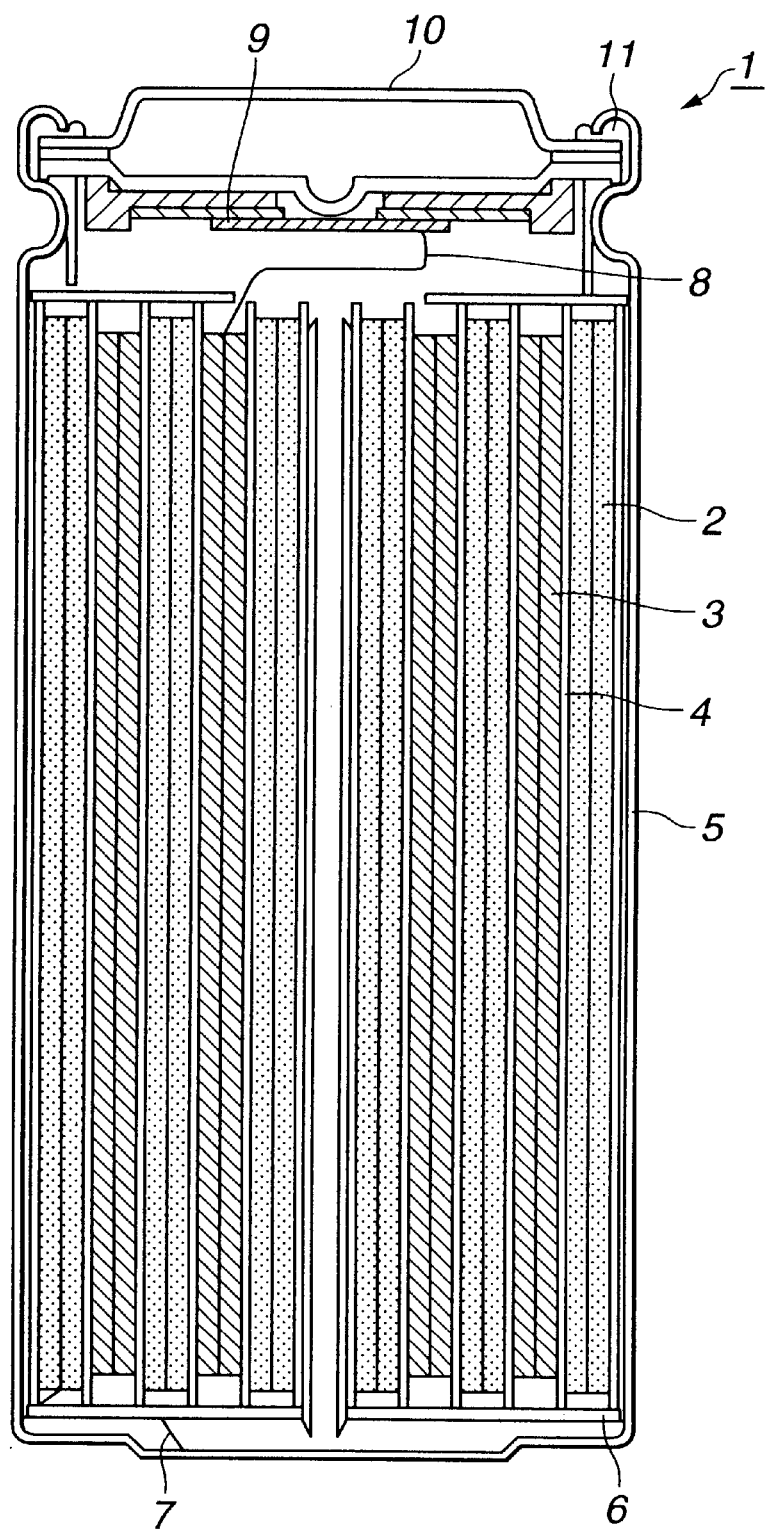
FIG. 1 is a cross-sectional view of a non-aqueous electrolyte secondary cell according to the present invention.

Hereinafter, detailed explanation is given on a non-aqueous electrolyte secondary cell according to the present invention.

The non-aqueous electrolyte secondary cell according to the present invention includes: a cathode containing a manganese oxide or a lithium-manganese composite oxide; an anode containing a lithium metal, a lithium alloy, or a material capable of doping/dedoping lithium; and an electrolyte containing at least two electrolyte salts.

The electrolyte may be a so-called non-aqueous electrolyte solution in a liquid state or may be a solid electrolyte or a gel electrolyte.

When using the so-called non-aqueous electrolyte solution in a liquid state, the non-aqueous solvent may be any of the various non-aqueous solvents conventionally used for the non-aqueous electrolyte solution. For example, it is possible to use: a cyclic carbonate such as propylene carbonate and ethylene carbonate; a chain carbonate such as diethyl carbonate and dimethyl carbonate; carboxylic ester such as methyl propionate and methyl butyrate; and ether such as γ-butyrolactone, sulfolane, and 2-methyl tetrahydrofuran. Each of these non-aqueous solvent may be used solely or in combination with others. Among these non-aqueous solvents, especially ones containing carbonate enables to obtain a stable oxidization.

The non-aqueous electrolyte solution contains at least two electrolyte salts, more specifically $LiBF_4$ and an electrolyte salt other than $LiBF_4$.

The $LiBF_4$ as one of the electrolyte salts is contained in the non-aqueous electrolyte solution in a range from 0.005 mol/l to 0.3 mol/l, or more preferably in a range from 0.01 mol/l to 0.05 mol/l.

The $LiBF_4$ is decomposed during charge to form a stable film on an anode surface. It is considered that this film prevents formation of other films which may disturb an electrochemical reaction.

When the content of $LiBF_4$ is below 0.005 mol/l, the film formation is insufficient and the desired effect cannot be obtained. On the other hand, when the content of $LiBF_4$ exceeds 0.3 mol/l, the thickness of the film is too great, disturbing the electrochemical reaction of the cell. This deteriorate the cell capacity.

Accordingly, By containing $LiBF_4$ in the range from 0.005 mol/l to 0.3 mol/l, a stable film can be obtained on the anode surface, improving the cycle characteristic.

As the electrolyte salt used together with such $LiBF_4$, there can be exemplified a lithium salt such as $LiPF_6$, $LiAsF_6$, $LiClO_4$, $LiCF_3SO_3$, $LiN(SO_2CF_3)_2$, $LiC(SO_2CF_3)_3$, $LiAlCl_4$, and $LiSiF_6$. It is especially preferable to use $LiPF_6$ which has a high electrical conductivity and a stable potential. Moreover, the electrolyte salt used together with $LiBF_4$ is preferably contained in the range from 0.5 mol/l to 2.0 mol/l.

When using a solid electrolyte or a gel electrolyte, it is possible to use the following as the polymer matrix containing the aforementioned non-aqueous electrolyte solution as a plasticizer: ether-based polymer such as polyethylene oxide or its bridged form, polymethacrylate ester, acrylate, polyvinylidene fluoride, vinylidene fluoride-hexafluoropropylene copolymer and other fluorine-based polymer. Each of these materials may be used solely or in combination with the others. It is especially preferable to use a fluorine-based polymer such as polyvinylidene fluoride or vinylidene fluoride-hexafluoropropylene copolymer. This enables to obtain stable oxidation and reduction.

The cathode is formed by a cathode active material layer containing a cathode active material on a cathode collector formed by a metal such as an aluminum foil.

The cathode active material may be manganese oxide having a high discharge potential and a high energy density or a lithium-manganese composite oxide expressed by $Li_{(1+x)}M_yMn_{(2-x-y)}O_4$ (wherein M represents a metal element other than Li and Mn, and the content range is $0 \leq x \leq 0.15$ and $0 \leq y \leq 0.3$). The metal element M excluding Li and Mn may be Al, Mg, Fe, Ni, Cr, Co, Zn, Ti and the like. The manganese oxide and the lithium-manganese composite oxide preferably has the spinel crystal structure.

The anode is an anode active material layer containing a lithium metal, a lithium alloy, or a material capable of doping/dedoping lithium as the anode active material formed on an anode collector formed by a metal such as a nickel foil.

For example, in the case of a lithium secondary cell utilizing dissolution and deposition of lithium, the anode active material may be a lithium metal or lithium alloy capable of doping/dedoping lithium such as a lithium-aluminum alloy.

In the case of lithium-ion secondary cell utilizing doping/dedoping of lithium ion, it is possible to use a non-graphitizable carbon or a graphite-based carbon material capable of doping/dedoping lithium. More specifically, it is possible to use pyrocarbons, cokes (such as pitch coke, needle coke, and petroleum coke), graphite, vitreous carbon, organic polymer compound sintered body (phenol resin, furan resin, or the like sintered at an appropriate temperature for carbonization), carbon materials such as carbon fiber and active carbon. It is also possible to use a polymer such as polyacetylene and polypyrrole or an oxide such as $SnO_2$.

When forming the anode using these materials, it is possible to a known binding agent.

The non-aqueous electrolyte secondary cell having the aforementioned configuration according to the present invention includes electrolyte containing at least two electrolyte salts. This electrolyte contains $LiBF_4$ as one of the electrolyte salts in a range from 0.005 mol/l to 0.3 mol/l. Accordingly, even when the cathode active material is a manganese oxide or lithium-manganese composite oxide, the cycle characteristic is improved and it is possible to prevent deterioration of the cell characteristic after repeated use.

Moreover, because this non-aqueous electrolyte secondary cell uses the cathode active material prepared from manganese which is a cheap raw material, it is possible to reduce the production cost and to increase the cell size requiring a plenty of the cathode active material.

It should be noted that this non-aqueous electrolyte secondary cell is not limited to a particular cell shape and can be made as a cylindrical type, prismatic type, coin type, button type or the like and may be produced as a small type or large type.

EXAMPLES

Hereinafter, the present invention will be detailed according to specific experiment results. It should be noted that the present invention is not limited to the specific examples within the spirit of the present invention.

Example 1

A non-aqueous electrolyte secondary cell 1 shown in FIG. 1 was prepared using a non-aqueous electrolyte solution as the electrolyte as follows.

Preparation of an Anode

Firstly, 90 weight part of graphite as the cathode active material was mixed with 10 weight parts of polyvinylidene fluoride as a binding agent so as to prepare an anode composite mixture and then the anode composite mixture was dispersed in N-methyl-2-pyrrolidone so as to obtain a slurry anode composite mixture.

Next, the slurry anode composite mixture was uniformly applied to the both surfaces of a band-shaped copper foil having a thickness of 10 micrometers to serve as an anode collector and dried to form the anode composite mixture layer, which was compression-molded using a roll press apparatus to obtain a band-shaped anode 2.

Preparation of a Cathode

Firstly, lithium carbonate ($Li_2CO_3$) powder was mixed with manganese carbonate ($MnCO_3$) powder at the mol ratio of Li/Mn=1/2 and sintered in the air at the temperature of 800° C. so as to synthesize a lithium-manganese composite oxide. The lithium-manganese composite oxide obtained was subjected to powder X-ray diffraction. The analysis result was almost identical to the $LiMn_2O_4$ described in the ISDD card 35-782.

Next, a cathode composite mixture was prepared by mixing 91 weight parts of the lithium-manganese composite oxide obtained as described above as the cathode active material, 6 weight parts of graphite as a conductive material, and 3 weight parts of polyvinylidene fluoride as a binding agent. This cathode composite mixture was dispersed in N-methyl-2-pyrrolidone to obtain a slurry cathode composite mixture.

The slurry cathode composite mixture was uniformly applied onto the both surfaces of a band-shaped aluminum foil having a thickness of 20 micrometers to serve as a cathode collector and dried to form a cathode composite mixture layer, which was compression-molded using a roll press apparatus to obtain a band-shaped cathode 3.

Preparation of the Non-aqueous Electrolyte Solution

Electrolyte salts of $LiPF_6$ 1.0 mol/l and $LiBF_4$ 0.01 mol/l were solved in a mixed solvent containing 30% capacity factor of ethylene carbonate and 70% capacity factor of dimethyl carbonate so as to obtain a non-aqueous electrolyte solution.

The anode 2 and the cathode 3 thus prepared were arranged via a separator 4 made from a porous polypropylene film having a thickness of 25 micrometers. That is, the anode 2, the separator 4, the cathode 3, and the separator 4 were tightly layered in this order and coiled plenty of times to prepare a plurality of spirally coiled electrode body.

Next, an insulation plate 6 was inserted to the bottom of an cell can 5 prepared from iron plated by nickel and then the electrode was placed in the cell can 5. For collection of the anode 2, one end of a nickel anode lead 7 was attached to the anode 2 and the other end was welded to the cell can 5. In addition, for collection of the cathode 3, one end of an aluminum cathode lead 8 was attached to the cathode 3 and the other end was welded onto a cell cover 10 via a current shutting-off thin plate 9 for shutting off current according to cell inner pressure. The non-aqueous electrolyte solution prepared as has been described above was pored into the cell can 5 and then the cell can 5 was caulked via an insulation sealing gasket 11 painted with asphalt so as to fix the cell cover 10. Thus a cylindrical non-aqueous electrolyte secondary cell 1 was prepared with a diameter of 18 mm and a height of 65 mm.

Examples 2 to 9, and Comparative Examples 1 to 5

Non-aqueous electrolyte secondary cells were prepared in the same way as Example 1 except for that the composition of the electrolyte salts to be solved in the non-aqueous electrolyte solution were defined as shown in Table 1 below.

TABLE 1

|  | Content of $LiBF_4$ (mol/l) | Electrolyte salts other than $LiBF_4$ | Content (mol/l) |
| --- | --- | --- | --- |
| Example 1 | 0.01 | $LiPF_6$ | 1.0 |
| Example 2 | 0.05 | $LiPF_6$ | 1.0 |
| Example 3 | 0.1 | $LiPF_6$ | 1.0 |

TABLE 1-continued

|  | Content of $LiBF_4$ (mol/l) | Electrolyte salts other than $LiBF_4$ | Content (mol/l) |
| --- | --- | --- | --- |
| Example 4 | 0.005 | $LiPF_6$ | 1.0 |
| Example 5 | 0.3 | $LiPF_6$ | 1.0 |
| Example 6 | 0.01 | $LiN(C_2F_5SO_2)_2$ | 1.0 |
| Example 7 | 0.1 | $LiN(C_2F_5SO_2)_2$ | 1.0 |
| Example 8 | 0.01 | $LiCF_3SO_3$ | 1.0 |
| Example 9 | 0.1 | $LiCF_3SO_3$ | 1.0 |
| Comparative Example 1 | 0 | $LiPF_6$ | 1.0 |
| Comparative Example 2 | 0.001 | $LiPF_6$ | 1.0 |
| Comparative Example 3 | 0.35 | $LiPF_6$ | 1.0 |
| Comparative Example 4 | 0 | $LiN(C_2F_5SO_2)_2$ | 1.0 |
| Comparative Example 5 | 0 | $LiCF_3SO_3$ | 1.0 |

Example 10

A non-aqueous electrolyte secondary cell was prepared in the same way as Example 1 except for that the cathode active material used a composite oxide prepared by sintering a mixture of lithium carbonate ($Li_2CO_3$) powder, chromium oxide ($Cr_2O_3$) powder, and manganese carbonate ($MnCO_3$) powder with a mol ratio of Li/Cr/Mn=1.0/0.2/1.8.

Example 11

A non-aqueous electrolyte secondary cell was prepared in the same way as Example 3 except for that the cathode active material used the composite oxide prepared in Example 10.

Comparative Example 6

A non-aqueous electrolyte secondary cell was prepared in the same way as Comparative Example 1 except for that the cathode active material used the composite oxide prepared in Example 10.

Example 12

A non-aqueous electrolyte secondary cell was prepared in the same way as Example 1 except for that the cathode active material used a composite oxide prepared by sintering a mixture of lithium carbonate ($Li_2CO_3$) powder, chrome oxide ($Cr_2O_3$) powder, and manganese carbonate ($MnCO_3$) powder with a mol ratio of Li/Cr/Mn=1.0/0.15/1.85.

Examples 1 to 12 and Comparative Examples 1 to 6 were subjected to constant-voltage and constant-current charge with a charge current of 1.0A and a final voltage of 4.2V. Next, to evaluate discharge characteristic of these cells, a constant-current discharge was performed with a discharge current of 1.0A and a final voltage of 2.5V. These steps were performed as one cycle, which was repeated 300 times, and discharge capacity was measured at the fist cycle and at the 300-th cycle. The series of measurements was performed in the environment of 23° C.

Assume that C1 is the discharge capacity of the first cycle and C2 is the discharge capacity of the 300-th cycle. The ratio of C2 against C1 expressed by C2/C1×100 was obtained as the discharge capacity maintaining/retention ratio to evaluate the cell cycle characteristic. The measurement results are shown in Table 2.

TABLE 2

| | Initial capacity (mAh) | Capacity maintaining/retention ratio (%) |
|---|---|---|
| Example 1 | 1411 | 88 |
| Example 2 | 1409 | 88 |
| Example 3 | 1401 | 85 |
| Example 4 | 1412 | 83 |
| Example 5 | 1389 | 81 |
| Example 6 | 1408 | 84 |
| Example 7 | 1399 | 83 |
| Example 8 | 1408 | 83 |
| Example 9 | 1398 | 82 |
| Example 10 | 1411 | 88 |
| Example 11 | 1402 | 86 |
| Example 12 | 1411 | 87 |
| Comparative Example 1 | 1413 | 76 |
| Comparative Example 2 | 1413 | 78 |
| Comparative Example 3 | 1342 | 73 |
| Comparative Example 4 | 1409 | 75 |
| Comparative Example 5 | 1408 | 73 |
| Comparative Example 6 | 1413 | 78 |

As is clear from Table 2, Examples 1 to 12 containing $LiBF_4$ as an electrolyte salt in the electrolyte solution in the range from 0.005 mol/l to 0.3 mol/l had a high capacity maintaining/retention ratio exceeding 80%, thereby improving the cycle characteristic.

On the contrary, Comparative Examples 1, 4, 5, and 6 not containing $LiBF_4$ as one of the electrolyte salts showed capacity maintaining/retention ratio below 80%, deteriorating the cell characteristic as the charge/discharge cycle is increased.

Figure 2:
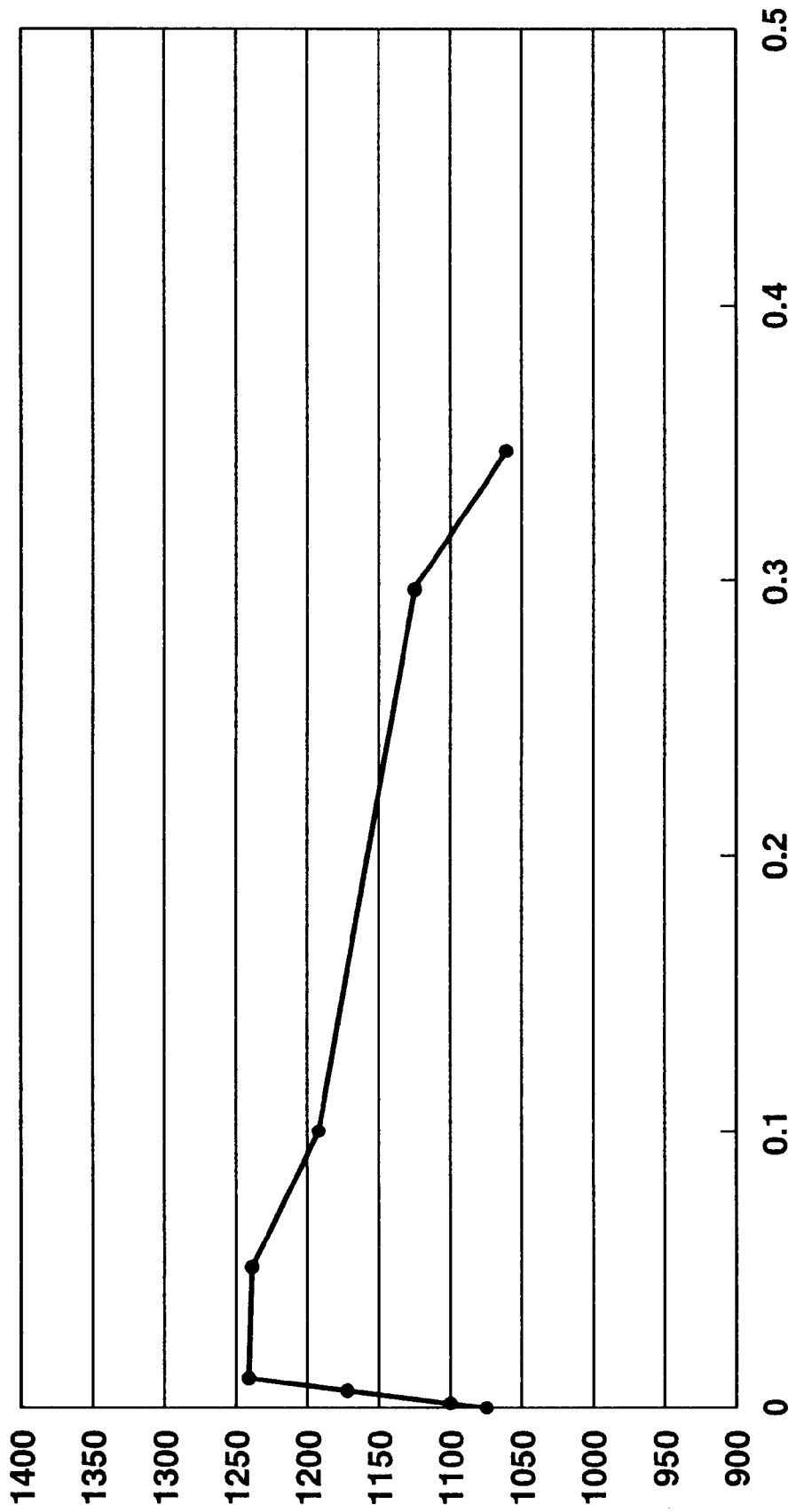
FIG. 2 shows a cell capacity of the non-aqueous electrolyte secondary cell after 300 cycles.

In addition, FIG. 2 shows the cell capacity of Examples 1 to 5 and Comparative Examples 1 to 3 after 300 cycles. It should be noted that in FIG. 2, the vertical axis shows the cell capacity (unit: mAh) after 300 cycles and the horizontal axis shows the content (unit: mol/l) of $LiBF_4$ in the electrolyte solution.

As is clear from FIG. 2, Examples 1 to 5 containing $LiBF_4$ as one of the electrolyte salts in the range from 0.005 mol/l to 0.3 mol/l had a large capacity exceeding 1100 mAh even after 300 cycles.

Comparative Example 2 containing $LiBF_4$ as one of the electrolyte salts in the range below 0.005 mol/l could not sufficiently suppress deterioration of the cell characteristic. On the other hand in Comparative Example 3 containing $LiBF_4$ as one of the electrolyte salts in the range exceeding 0.3 mol/l, the cell capacity was deteriorated.

This shows that the non-aqueous electrolyte secondary cell containing $LiBF_4$ as one of the electrolyte salts in the range from 0.005 mol/l to 0.3 mol/l can prevent deterioration of the cell characteristic even after repeatedly used.

Example 13

A non-aqueous electrolyte secondary cell was prepared as follows using a gel polymer electrolyte.

Preparation of an Anode

A slurry anode composite mixture was prepared in the same way as in Example 1 and uniformly applied onto one side of a band-shaped copper foil with thickness of 10 micrometers so as to serve as an anode collector and dried to form an anode composite mixture layer, which was then compression-molded into a band-shaped anode using a roll press apparatus.

Preparation of a Cathode

A band-shaped cathode was prepared in the same way as in Example 1.

Preparation of a Gel Polymer Electrolyte Solvent

A non-aqueous solvent was prepared by mixing 50% capacity factor of ethylene carbonate with 50% capacity factor of propylene carbonate. As the electrolyte salts, 1.0 mol/l of $LiPF_6$ and 0.01 mol/l of $LiBF_4$ were solved in the mixed solvent to prepare a non-aqueous electrolyte solution to serve as a plasticizer. Then, 30 weight parts of this plasticizer was mixed with 10 weight parts of polyvinylidene fluoride and 60 weight parts of dimethyl carbonate so as to obtain a solution.

The gel polymer electrolyte solution thus prepared was applied onto the anode active material layer formed on one side of the anode and onto the cathode active material layers formed on both sides of the cathode for impregnation which was kept 8 hours under an ambient temperature so as to evaporate and remove dimethyl carbonate to obtain a gel electrolyte.

Next, the cathode was attached to the anode via the surface having the gel electrolyte so as to prepare an electrode body to obtain a flat plate type gel electrolyte cell having size of 2.5 cm×4.0 cm and a thickness of 0.3 mm.

It should be noted this flat plate type gel electrolyte cell had a configuration that the electrode body was contained in an outer casing made from a laminate film and a lead was attached to each of the electrodes to be pulled outside.

Comparative Example 7

A flat plate type gel electrolyte cell was prepared in the same way as Example 13 except for using a non-aqueous electrolyte solution to serve as the plasticizer prepared by solving only $LiPF_6$ as an electrolyte salt with the ratio of 1.0 mol/l in a mixed solvent of 50% capacity factor of ethylene carbonate and 50% capacity factor of propylene carbonate.

Example 13 and Comparative Example 7 thus prepared were subjected to constant-voltage and constant-current charge for 3 hours with a charge current of 15 mA and the final voltage of 4.2V. Next, in order to evaluate the discharge characteristic of these cell, a constant-current discharge was performed with the discharge current 15 mA and the final voltage 2.5V. These steps constitute one cycle and 300 cycles were repeated, so that discharge capacity at the first cycle and that of the 300-th cycle were measured. It should be noted that these measurements were performed at the temperature of 23° C.

Moreover, in the same way as the measurement of the discharge capacity maintaining/retention ratio of the non-aqueous electrolyte secondary cell, the discharge capacity of the flat plate type gel electrolyte cells of Example 13 and Comparative Example 7 were obtained to evaluate the cell cycle characteristic. The measurement results are shown in Table 3 below.

TABLE 3

|  | Initial capacity (mAh) | Capacity maintaining/retention ratio (%) |
|---|---|---|
| Example 13 | 30 | 89 |
| Comparative Example 7 | 31 | 77 |

As is clear from Table 3, Example 13 containing LiBF$_4$ as one of the electrolyte salts showed a capacity maintaining/retention ratio exceeding 80%, thereby improving the cycle characteristic.

In contrast to this, Comparative Example 7 not containing LiBF$_4$ as one of the electrolyte salts showed a capacity maintaining/retention ratio below 80% and the cell characteristic was deteriorated as the charge/discharge cycle proceeded.

This shows that even in the case of the non-aqueous electrolyte secondary cell (the flat plate type gel electrolyte cell) using the gel polymer electrolyte, by containing LiBF$_4$ as one of the electrolyte salts in the predetermined range, the cell characteristic is not deteriorated even after a repeated use.

As is clear from the aforementioned, the non-aqueous electrolyte secondary cell according to the present invention uses a manganese oxide or a lithium-manganese composite oxide as the cathode active material and includes an electrolyte containing at least two electrolyte salts which electrolyte contains LiBF$_4$ as one of the electrolyte salt in the range from 0.005 mol/l to 0.3 mol/l. This enables to improve the cycle characteristic and prevents deterioration of the cell characteristic as the charge/discharge cycle is repeated.

Moreover, because this non-aqueous electrolyte secondary cell uses a cathode active material prepared from a cheap manganese raw material, it is possible to reduce the production cost, enabling to increase the cell size requiring a plenty of the cathode active material. This enables to spread the non-aqueous electrolyte secondary cells in a wide range.

What is claimed is:

1. A non-aqueous electrolyte secondary cell comprising:

a cathode containing a manganese oxide or a lithium-manganese composite oxide;

an anode containing a lithium metal, a lithium alloy, or a material capable of doping/dedoping lithium; and an electrolyte containing at least two electrolyte salts;

wherein one of the electrolyte salts is LiBF$_4$ contained in the range from 0.005 mol/l to 0.05 mol/l.

2. The non-aqueous electrolyte secondary cell as claimed in claim 1, wherein the manganese oxide or the lithium-manganese composite oxide contained in the cathode has a spinel crystal structure.

3. The non-aqueous electrolyte secondary cell as claimed in claim 2, wherein the lithium-manganese composite oxide is a compound expressed by Li$_{(1+x)}$M$_y$Mn$_{(2-x-y)}$O$_4$ (wherein M represents a metal element other than Li and Mn, x is in a range from 0 or more to 0.15 or lower, and y is in a range from 0 or more to 0.3 or lower).

4. The non-aqueous electrolyte secondary cell as claimed in claim 2, wherein the lithium-manganese composite oxide is a compound expressed by LiMn$_2$O$_4$.

5. The non-aqueous electrolyte secondary cell as claimed in claim 1, wherein the electrolyte salt other than LiBF$_4$ is LiPF$_6$, LiAsF$_6$, LiClO$_4$, LiCF$_3$SO$_3$, LiN(SO$_2$CF$_3$)$_2$, LiC(SO$_2$CF$_3$)$_3$, LiAlCl$_4$, or LiSiF$_6$.

6. The non-aqueous electrolyte secondary cell as claimed in claim 1, wherein the material capable of doping/dedoping lithium is a carbon material.

* * * * *